United States Patent
Yeh

(10) Patent No.: US 8,667,210 B2
(45) Date of Patent: Mar. 4, 2014

(54) MEMORY MANAGEMENT METHOD, MEMORY CONTROLLER AND MEMORY STORAGE APPARATUS

(75) Inventor: Chih-Kang Yeh, Kinmen County (TW)

(73) Assignee: Phison Electronics Corp., Miaoli (TW)

( * ) Notice: Subject to any disclaimer, the term of this patent is extended or adjusted under 35 U.S.C. 154(b) by 335 days.

(21) Appl. No.: 13/109,968

(22) Filed: May 17, 2011

(65) Prior Publication Data

US 2012/0210075 A1 Aug. 16, 2012

(30) Foreign Application Priority Data

Feb. 15, 2011 (TW) .............................. 100104918 A

(51) Int. Cl.
*G06F 12/00* (2006.01)

(52) U.S. Cl.
USPC ........... 711/103; 711/147; 711/154; 711/173; 711/E12.001

(58) Field of Classification Search
USPC .................................. 711/103, 154, E12.001
See application file for complete search history.

(56) References Cited

U.S. PATENT DOCUMENTS

| | | | |
|---|---|---|---|
| 8,356,136 B2 * | 1/2013 | Chang et al. .................. | 711/103 |
| 2009/0222618 A1 * | 9/2009 | Cho .............................. | 711/103 |
| 2010/0191908 A1 * | 7/2010 | Yamakawa .................... | 711/114 |

* cited by examiner

*Primary Examiner* — Reginald Bragdon
*Assistant Examiner* — Christopher Do
(74) *Attorney, Agent, or Firm* — Jianq Chyun IP Office

(57) ABSTRACT

A memory management method for managing physical units of a rewritable non-volatile memory module is provided. In the method, the physical units are grouped into at least a data area and a free area. The method includes obtaining empty physical units from the free area to configure a first global random area and obtaining empty physical units from the data area to configure a second global random area. The method further includes using the physical units of the first global random area to write updated data, and using the physical units of the second global random area to write other updated data after the physical units of the first global random area are written full of the updated data. Accordingly, the method can increase the storage space of a global random area, and thereby reduces data merging operations and shortens the time for executing a write command.

31 Claims, 10 Drawing Sheets

MEMORY MANAGEMENT METHOD, MEMORY CONTROLLER AND MEMORY STORAGE APPARATUS

CROSS-REFERENCE TO RELATED APPLICATION

This application claims the priority benefit of Taiwan application serial no. 100104918, filed Feb. 15, 2011. The entirety of the above-mentioned patent application is hereby incorporated by reference herein and made a part of this specification.

BACKGROUND

1. Technology Field

The present invention relates to a memory management method. Particularly, the present invention relates to a memory management method for managing a rewritable non-volatile memory module, and a memory controller and a memory storage apparatus using the same.

2. Description of Related Art

Digital cameras, cell phones, and MP3 players have undergone rapid growth in recent years, so that consumer demand for storage media have also rapid increased. A rewritable non-volatile memory is one of the most adaptable memories for electronic products (for example, notebook computers) due to its characteristics such as data non-volatility, low power consumption, small volume, non-mechanical structure, and high read-and-write speed. A solid state drive (SSD) is a storage apparatus which uses a flash memory as its storage medium. Thus, in recent years, the flash memory industry has become a major part of the electronic industry.

Memory sub-modules of a rewritable non-volatile memory module have a plurality of physical units, and each of the physical units is composed of one or a plurality of physical blocks, and each physical block has a plurality of physical pages, where when data is written into the physical block, it has to be sequentially written according to a sequence of the physical pages. Moreover, the physical pages written with data have to be erased first for again writing data thereon. Particularly, the physical block is the smallest unit that can be erased, and the physical page is the smallest unit that can be programmed (written). Therefore, in management of the flash memory module, the physical units are grouped into a data area and a free area.

The physical units of the data area are used for storing data stored by a host system. In detail, a memory management circuit converts a logical access address accessed by the host system into a logical page of a logical unit, and maps the logical page of the logical unit to a physical page of a physical unit of the data area. Namely, in management of the rewritable non-volatile memory module, the physical units of the data area are regarded as used physical units (for example, stored with data written by the host system). For example, the memory management circuit may use a logical unit-physical unit mapping table to record a mapping relationship between the logical units and the physical units of the data area, where the logical pages of the logical unit sequentially correspond to the physical pages of the mapped physical unit.

The physical units of the free area are used to substitute the physical units of the data area. In detail, as described above, the physical block written with data has to be erased first for again writing data thereon, so that the physical units of the free area are designed to be written with updated data to substitute the physical units originally mapped to the logical unit. Therefore, the physical units in the free area are empty or available physical units, i.e. physical units that are not stored with data or physical units stored with data marked to be invalid.

Namely, in management of the rewritable non-volatile memory module, the physical pages of the physical units of the data area and the free area are used to map the logical pages of the logical units in an alternate approach, so as to store the data written by the host system. Therefore, how to effectively manage the physical units of the data area and the free area to shorten the time for executing a write command is an important issue to be developed by related practitioners.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a memory management method, a memory controller and a memory storage apparatus, which can effectively shorten the time for executing a write command.

An exemplary embodiment of the present invention provides a memory management method for managing a plurality of physical units of a rewritable non-volatile memory module, wherein each of the physical units has a plurality of physical pages arranged in a sequence, and the physical units are grouped into at least a data area and a free area, and the physical units of the free area are used to substitute the physical units of the data area for writing data. The method includes configuring a plurality of logical units for mapping to the physical units of the data area, wherein each of the logical units has a plurality of logical pages. The method also includes getting (or selecting) a plurality of empty physical units from the free area to serve as a first global random area, getting a plurality of empty physical units from the data area to serve as a second global random area, and using the physical units of the first global random area to write updated data, wherein the updated data belongs to a plurality of updated logical units among the logical units. The method still includes determining whether the number of the physical units that are not written with the updated data among the physical units of the first global random area is smaller than a first predetermined threshold; and when the number of the physical units that are not written with the updated data among the physical units of the first global random area is smaller than the first predetermined threshold, calculating a storage state assessing value corresponding to the first global random area and determining whether the storage state assessing value is larger than a predetermined assessing threshold. The method further includes, when the storage state assessing value is not larger than the predetermined assessing threshold, using the physical units of the second global random area to write other updated data after the physical units of the first global random area are written full of the updated data.

An exemplary embodiment of the present invention provides a memory controller for controlling a rewritable non-volatile memory module, where the rewritable non-volatile memory module has a plurality of physical units, and each of the physical units has a plurality of physical pages arranged in a sequence. The memory controller includes a memory interface and a memory management circuit. The memory interface is coupled to the rewritable non-volatile memory module, and the memory management circuit is coupled to the memory interface. The memory management circuit is configured for grouping the physical units into at least a data area and a free area, wherein the physical units of the free area are used to substitute the physical units of the data area for writing data. Moreover, the memory management circuit configures a plurality of logical units for mapping to the physical units of the data area, wherein each of the logical units has a plurality of logical pages. In addition, the memory management circuit gets a plurality of empty physical units from the physical units of the free area to serve as a first global random area, gets a plurality of empty physical units from the physical units of the data area to serve as a second global random area, and uses the physical units of the first global random area to write updated data, wherein the updated data belongs to a plurality of updated logical units among the logical units. Moreover, the memory management circuit determines whether the number of the physical units that are not written with the updated data among the physical units of the first global random area is smaller than a first predetermined threshold. When the number of the physical units that are not written with the updated data among the physical units of the first global random area is smaller than the first predetermined threshold, the memory management circuit calculates a storage state assessing value corresponding to the first global random area, and determines whether the storage state assessing value is larger than a predetermined assessing threshold. Moreover, when the storage state assessing value is not larger than the predetermined assessing threshold, the memory management circuit uses the physical units of the second global random area to write other updated data after the physical units of the first global random area are written full of the updated data.

An exemplary embodiment of the present invention provides a memory storage apparatus including a rewritable non-volatile memory module and a memory controller. The rewritable non-volatile memory module has a plurality of physical units, and each of the physical units has a plurality of physical pages arranged in a sequence. The memory controller is coupled to the rewritable non-volatile memory module. The memory controller is configured for grouping the physical units into at least a data area and a free area, wherein the physical units of the free area are used to substitute the physical units of the data area for writing data. Moreover, the memory controller configures a plurality of logical units for mapping to the physical units of the data area, wherein each of the logical units has a plurality of logical pages. In addition, the memory controller gets a plurality of empty physical units from the free area to serve as a first global random area, gets a plurality of empty physical units from the data area to serve as a second global random area, and uses the physical units of the first global random area to write updated data, wherein the updated data belongs to a plurality of updated logical units among the logical units. Moreover, the memory controller determines whether the number of the physical units that are not written with the updated data among the physical units of the first global random area is smaller than a first predetermined threshold. When the number of the physical units that are not written with the updated data among the physical units of the first global random area is smaller than the first predetermined threshold, the memory controller calculates a storage state assessing value corresponding to the first global random area, and determines whether the storage state assessing value is larger than a predetermined assessing threshold. Moreover, when the storage state assessing value is not larger than the predetermined assessing threshold, the memory controller uses the physical units of the second global random area to write other updated data after the physical units of the first global random area are written full of the updated data.

According to the above descriptions, in the memory management method, the memory controller and the memory storage apparatus of the present invention, the physical units that are not written with data in the data area can be used to expand a storage space of the global random area, so as to reduce data merging operations and shorten the time for executing a write command.

It should be understood, however, that this Summary may not contain all of the aspects and embodiments of the present invention, is not meant to be limiting or restrictive in any manner, and that the present invention as disclosed herein is and will be understood by those of ordinary skill in the art to encompass obvious improvements and modifications thereto.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DETAILED DESCRIPTION OF DISCLOSED EMBODIMENTS

Figure 1A:
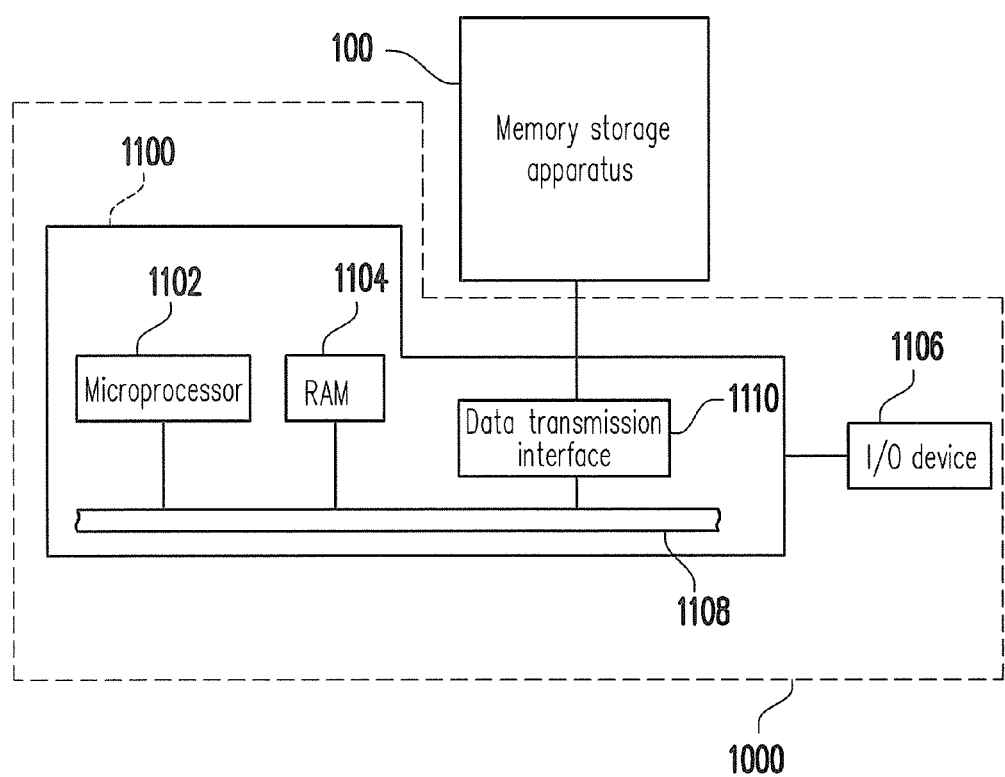
FIG. 1A is a diagram illustrating a host system and a memory storage apparatus according to an exemplary embodiment of the present invention.

Reference will now be made in detail to the present preferred embodiments of the present invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In a memory management method of the present invention, a plurality of empty physical units is gotten (or selected) from physical units of a free area to serve as a first global random area, and a plurality of empty physical units is gotten from a data area to serve as a second global random area. Moreover, after the physical units of the first global random area are used to write updated data, it is determined whether the number of the physical units that are not written with the updated data among the physical units of the first global random area is smaller than a first predetermined threshold. Moreover, when the number of the physical units that are not written with the updated data among the physical units of the first global random area is smaller than the first predetermined threshold, a storage state assessing value corresponding to the first global random area is calculated, and it is determined whether the storage state assessing value is larger than a predetermined assessing threshold. When the storage state assessing value is not larger than the predetermined assessing threshold, the physical units of the second global random area are used to write other updated data after the physical units of the first global random area are written full of the updated data. In this way, the memory management method of the present invention can configure more physical units to serve as the global random area, so as to improve efficiency of writing data. In order to clearly describe the present invention, an exemplary embodiment is provided below with reference of a figure for description.

Generally, a memory storage apparatus (which is also referred to as a memory storage system) includes a rewritable non-volatile memory module and a controller (which is also referred to as a control circuit). The memory storage apparatus is generally used together with a host system, so that the host system can write data into the memory storage apparatus or read data from the memory storage apparatus.

FIG. 1A is a diagram illustrating a host system and a memory storage apparatus according to an exemplary embodiment of the present invention.

Figure 1B:
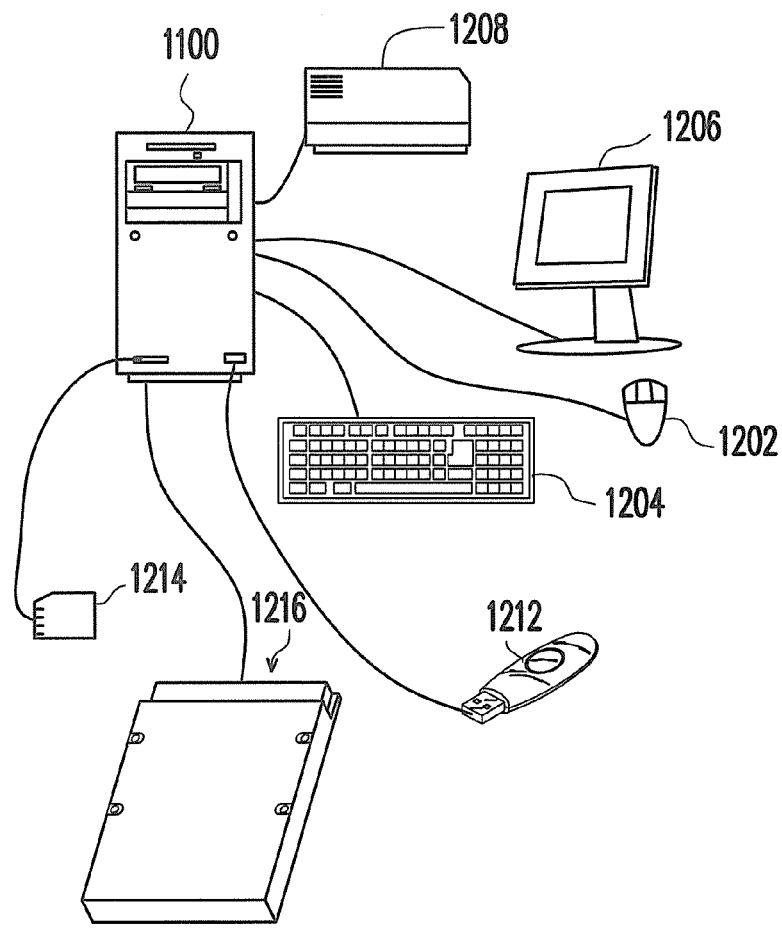
FIG. 1B is a schematic diagram illustrating a computer, input/output devices and memory storage apparatus according to an exemplary embodiment of the present invention.

Referring to FIG. 1A, the host system 1000 generally includes a computer 1100 and an input/output (I/O) device 1106. The computer 1100 includes a microprocessor 1102, a random access memory (RAM) 1104, a system bus 1108 and a data transmission interface 1110. The I/O device 1106 includes a mouse 1202, a keyboard 1204, a display 1206 and a printer 1208 shown in FIG. 1B. It should be noticed that the devices shown in FIG. 1B are not used to limit to the I/O device 1106, and the I/O device 1106 may also include other devices.

In the present exemplary embodiment, the memory storage apparatus 100 is coupled to the other devices of the host system 1000 through the data transmission interface 1110. Based on operations of the microprocessor 1102, the RAM 1104, and the I/O device 1106, data can be written into the memory storage apparatus 100 or read from the memory storage apparatus 100. For example, the memory storage apparatus 100 can be a rewritable non-volatile memory storage device such as a flash drive 1212, a memory card 1214 or a solid state drive (SSD) 1216 shown in FIG. 1B.

Figure 1C:
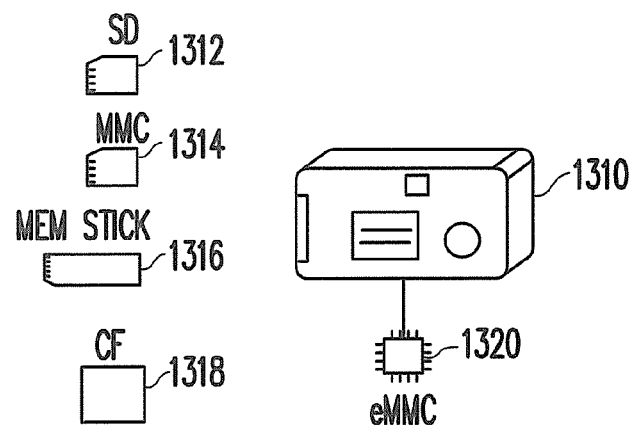
FIG. 1C is a schematic diagram illustrating a host system and memory storage apparatus according to another exemplary embodiments of the present invention.

Generally, the host system 1000 can be any system substantially used together with the memory storage apparatus 100 for storing data. In the present exemplary embodiment, although the host system 1000 implemented by a computer system is taken as an example, in another exemplary embodiment of the present invention, the host system 1000 can also be a digital camera, a video camera, a communication device, an audio player or a video player, etc. For example, when the host system is a digital camera (video camera) 1310, the rewritable non-volatile memory storage apparatus is a secure digital (SD) card 1312, a multimedia card (MMC) card 1314, a memory stick (MS) 1316, a compact flash (CF) card 1318 or an embedded storage device 1320 (shown in FIG. 1C). The embedded storage device 1320 includes an embedded MMC (eMMC). It should be noticed that the eMMC is directly coupled to a substrate of the host system.

Figure 2:
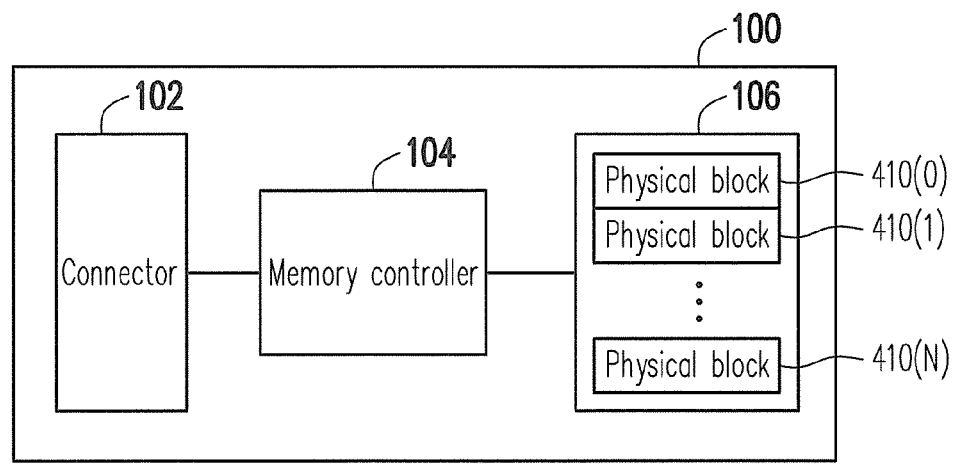
FIG. 2 is a schematic block diagram of a memory storage apparatus of FIG. 1A.

FIG. 2 is a schematic block diagram of a memory storage apparatus of FIG. 1A.

Referring to FIG. 2, the memory storage apparatus 100 includes a connector 102, a memory controller 104 and a rewritable non-volatile memory module 106.

In the present exemplary embodiment, the connector 102 is complied with a serial advanced technology attachment (SATA) standard. However, it should be noticed that the present invention is not limited thereto, and the connector 102 can also be complied with an institute of electrical and electronic engineers (IEEE) 1394 standard, a parallel advanced technology attachment (PATA) standard, a peripheral component interconnect express (PCI express) standard, a universal serial buss (USB) standard, a SD interface standard, a MS interface standard, a MMC interface standard, a CF interface standard, an integrated drive electronics (IDE) interface standard or other suitable standards.

The memory controller 104 may execute a plurality of logic gates or control instructions implemented by a hardware form or a firmware form, and may perform a program (i.e., write) operation, a read operation or an erase operation on the rewritable non-volatile memory module 106 according to operation commands of the host system 1000.

The rewritable non-volatile memory module 106 is coupled to the memory controller 104 and is configured for storing data written by the host system 1000. The rewritable non-volatile memory module 106 has physical blocks 410(0)-410(N). For example, the physical blocks 410(0)-410(N) are belonged to a same memory die or belonged to different memory dies. Each physical block has a plurality of physical pages, and each physical page has at least one physical sector, where the physical pages belonged to the same physical block are independently written and are simultaneously erased. For example, each physical block is composed of 128 physical pages, and each physical page has 8 physical sectors. Namely, in an example that each physical sector has 512 bytes, each physical page has a capacity of 4 kilobyte (KB). However, it should be noticed that the present invention is not limited thereto, and each physical block can be composed of 64 physical pages, 256 physical pages or any other number of the physical pages.

To be specific, physical block is the smallest unit for erasing data. Namely, each physical block contains the least number of memory cells that are erased all together. Physical page is the smallest unit for programming data. Namely, physical page is the smallest unit for writing data. However, in another exemplary embodiment of the present invention, the smallest unit for writing data may also be sector or any other unit. Each physical page usually includes a data bit area and a redundant bit area. The data bit area is used for storing user data, and the redundant bit area is used for storing system data (for example, error checking and correcting (ECC) codes). Here, data to be written into the physical pages is referred to as data, i.e. the size of one data is equal to the size of the data bit area of one physical page.

In the present exemplary embodiment, the rewritable non-volatile memory module 106 is a multi level cell (MLC) NAND flash memory module. However, the present invention is not limited thereto, and the rewritable non-volatile memory module 106 can also be a single level cell (SLC) NAND flash memory module, other flash memory modules or other memory modules having the same characteristic.

Figure 3:
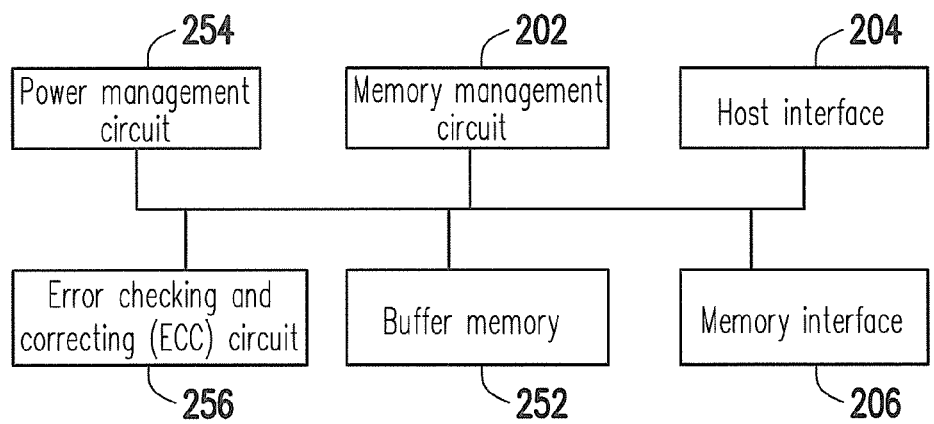
FIG. 3 is a schematic block diagram of a memory controller according to an exemplary embodiment of the present invention.

FIG. 3 is a schematic block diagram of a memory controller according to an exemplary embodiment of the present invention.

Referring to FIG. 3, the memory controller 104 includes a memory management circuit 202, a host interface 204 and a memory interface 206.

The memory management circuit 202 is configured for controlling a whole operation of the memory controller 104. In detail, the memory management circuit 202 has a plurality of control instructions, and when the memory storage apparatus 100 is in operation, these control instructions are executed to perform various operations, such as data write, read and erase operations.

In the present exemplary embodiment, the control instructions of the memory management circuit 202 are implemented in a firmware form. For example, the memory management circuit 202 has a micro processing unit (not shown) and a read-only memory (not shown), and these control instructions are burned into the read-only memory. When the memory storage apparatus 100 is in operation, these control instructions are executed by the micro processing unit to carry out various data operations.

In another exemplary embodiment, the control instructions of the memory management circuit 202 can also be stored in a specific area (for example, a system area used for storing system data in the rewritable non-volatile memory module) of the rewritable non-volatile memory module 106 as program codes. Moreover, the memory management circuit 202 has a micro processing unit (not shown), a read-only memory (not shown) and a random access memory (RAM) (not shown). Particularly, the read-only memory has a driving code, and when the memory controller 104 is enabled, the micro processing unit first executes the driving code to load the control commands stored in the rewritable non-volatile memory module 106 to the RAM of the memory management circuit 202. Then, the micro processing unit executes these control instructions to perform various data operations. Moreover, in another exemplary embodiment of the present invention, the control commands of the memory management circuit 202 can also be implemented in a hardware form.

The host interface 204 is coupled to the memory management circuit 202, and is configured for receiving and recognizing commands and data transmitted by the host system 1000. Namely, the commands and data transmitted by the host system 1000 are transmitted to the memory management circuit 202 through the host interface 204. In the present exemplary embodiment, the host interface 204 is complied with the SATA standard. However, the present invention is not limited thereto, and the host interface 204 can also be complied with a parallel advanced technology attachment (PATA) standard, the IEEE 1394 standard, the PCI express standard, the USB standard, the SD standard, the MS standard, the MMC standard, the CF standard, the IDE standard or other suitable data transmission standards.

The memory interface 206 is coupled to the memory management circuit 202 and is configured to access the rewritable non-volatile memory module 106. Namely, data to be written into the rewritable non-volatile memory module 106 is converted into a format that can be accepted by the rewritable non-volatile memory module 106 through the memory interface 206.

In an exemplary embodiment of the present invention, the memory controller 104 further includes a buffer memory 252. The buffer memory 252 is coupled to the memory management circuit 202 and is configured to temporarily store data and commands from the host system 1000 or data from the rewritable non-volatile memory module 106.

In an exemplary embodiment of the present invention, the memory controller 104 further includes a power management circuit 254. The power management circuit 254 is coupled to the memory management circuit 202 and is configured to control the power of the memory storage apparatus 100.

In an exemplary embodiment of the present invention, the memory controller 104 further includes an error checking and correcting (ECC) circuit 256. The ECC circuit 256 is coupled to the memory management circuit 202 and is configured to execute an error checking and correcting procedure to ensure correctness of data. In detail, when the memory management circuit 202 receives a write command from the host system 1000, the ECC circuit 256 generates a corresponding error checking and correcting code (ECC code) for data corresponding to the write command, and the memory management circuit 202 writes the data corresponding to the write command and the corresponding ECC code together into the rewritable non-volatile memory module 106. Then, when the memory management circuit 202 reads data from the rewritable non-volatile memory module 106, it simultaneously reads the ECC code corresponding to the data, and the ECC circuit 256 executes the error checking and correcting procedure on the read data according to the ECC code.

Figure 4A:
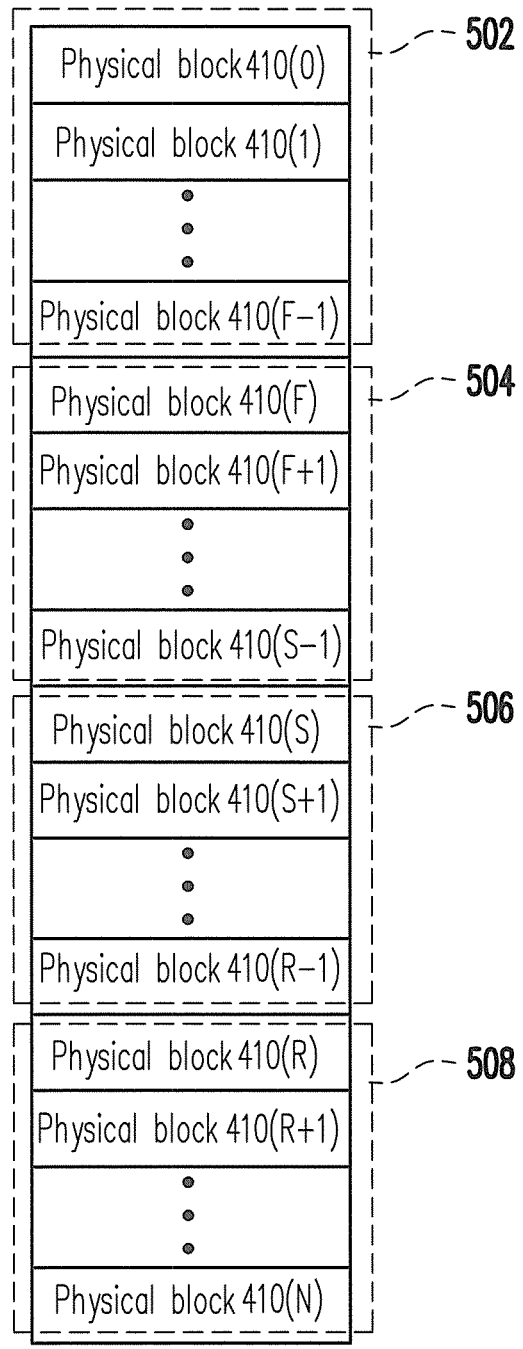
FIG. 4A and FIG. 4B are schematic diagrams illustrating examples of managing physical blocks according to an exemplary embodiment of the present invention.
Figure 4B:
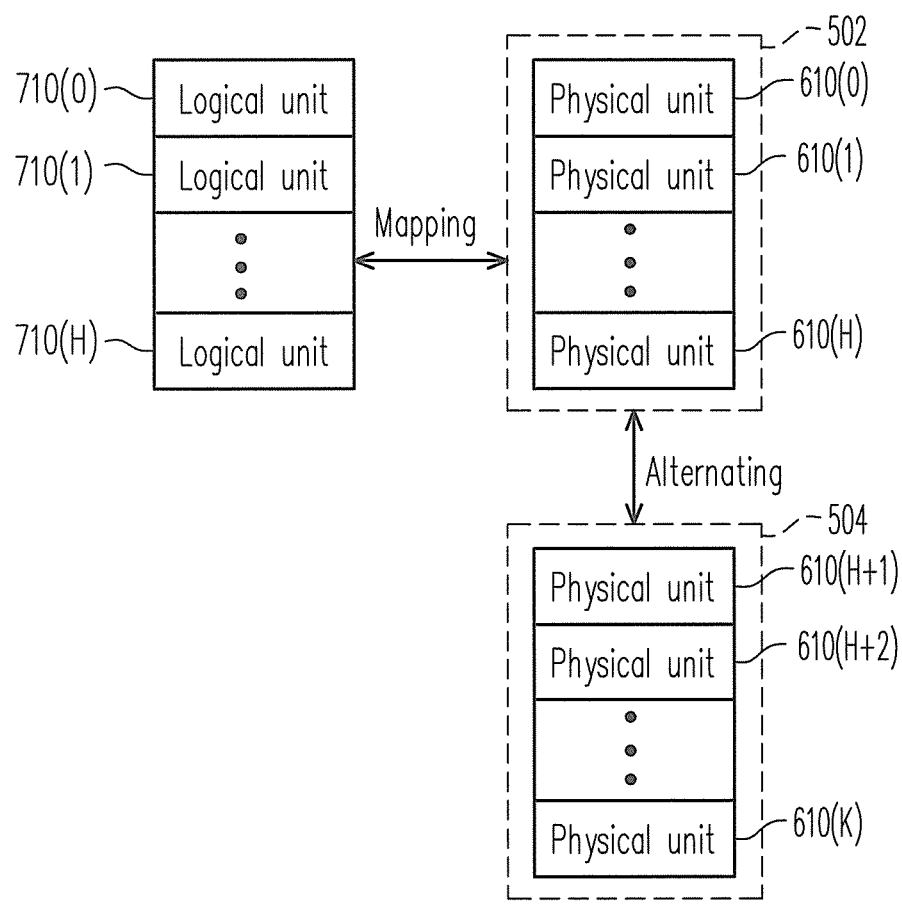

FIG. 4A and FIG. 4B are schematic diagrams illustrating examples of managing physical blocks according to an exemplary embodiment of the present invention.

Referring to FIG. 4A, the memory management circuit 202 of the memory controller 104 logically groups the physical blocks 410(0)-410(N) into a data area 502, a free area 504, a system area 506 and a replacement area 508.

The physical blocks logically belonged to the data area 502 and the free area 504 are used to store data from the host system 1000. In detail, the physical blocks of the data area 502 are regarded as physical blocks already stored with data, and the physical blocks of the free area 504 are used to substitute the physical blocks of the data area 502. Namely, when the host system 1000 receives the write command and data to be written, the memory management circuit 202 gets physical blocks from the free area 504, and write the data into the gotten physical blocks to substitute the physical blocks of the data area 502.

The physical blocks logically belonged to the system area 506 are used for storing system data. For example, the system data includes manufacturer and a model number of the rewritable non-volatile memory module, the number of the physical blocks of the rewritable non-volatile memory module, and the number of physical pages in each physical block, etc.

The physical blocks logically belonged to the replacement area 508 are used to a damaged physical block replacing procedure for replacing the damaged physical blocks. In detail, when the replacement area 508 still has normal physical blocks and some physical blocks in the data area 502 are damaged, the memory management circuit 202 gets the normal physical blocks from the replacement area 508 to replace the damaged physical blocks.

Referring to FIG. 4B, the memory management circuit 202 groups the physical blocks 410(0)-410(S−1) of the data area 502 and the free area 504 into physical units 610(0)-610(K), and the physical unit is taken as a unit to manage the physical blocks. In the present exemplary embodiment, each physical unit is composed of one physical block. However, it should be noticed that the present invention is not limited thereto, and in another exemplary embodiment, each physical unit can also be composed of at least two physical blocks belonged to the same memory sub-module or belonged to different memory sub-modules. Moreover, in another exemplary embodiment of the present invention, the physical blocks of the system area 506 and the replacement area 508 can also be grouped into physical units for management.

In the present exemplary embodiment, the memory management circuit 202 configures logical units 710(0)-710(H) to map to the physical units of the data area 502, wherein each logical unit has a plurality of logical pages for sequentially mapping the physical pages of the corresponding physical unit. In the present exemplary embodiment, each logical page maps to one physical page (i.e. a capacity of one logical page is equal to a capacity of one physical page). However, in case that each physical unit is composed of multiple physical blocks, each logical page can also map to a plurality of physical pages (i.e. the capacity of one logical page is equal to the capacity of multiple physical pages).

In the present exemplary embodiment, the memory management circuit 202 maintains a logical unit-physical unit mapping table to record a mapping relationship between the logical units 710(0)-710(H) and the physical units of the data area 502. For example, when the host system 1000 is about to access a certain logical access address, the memory management circuit 202 converts the logical access address accessed by the host system 1000 into an address formed by the corresponding logical unit, logical pages and logical sectors, and accesses data of the physical pages of the corresponding physical unit according to the logical unit-physical unit mapping table.

In the present exemplary embodiment, the memory management circuit 202 configures a part of the physical units into a global random area and writes data (which is also referred to as updated data) in the write command of the host system 1000 into the global random area. In detail, the memory management circuit 202 gets a plurality of empty physical units from the free area 504 to serve as a first global random area, and gets a plurality of empty physical units from the data area 502 to serve as a second global random area. Herein, the so-called empty physical unit refers to the physical unit that is not written with data or data stored therein is invalid and can be erased.

Figure 5:
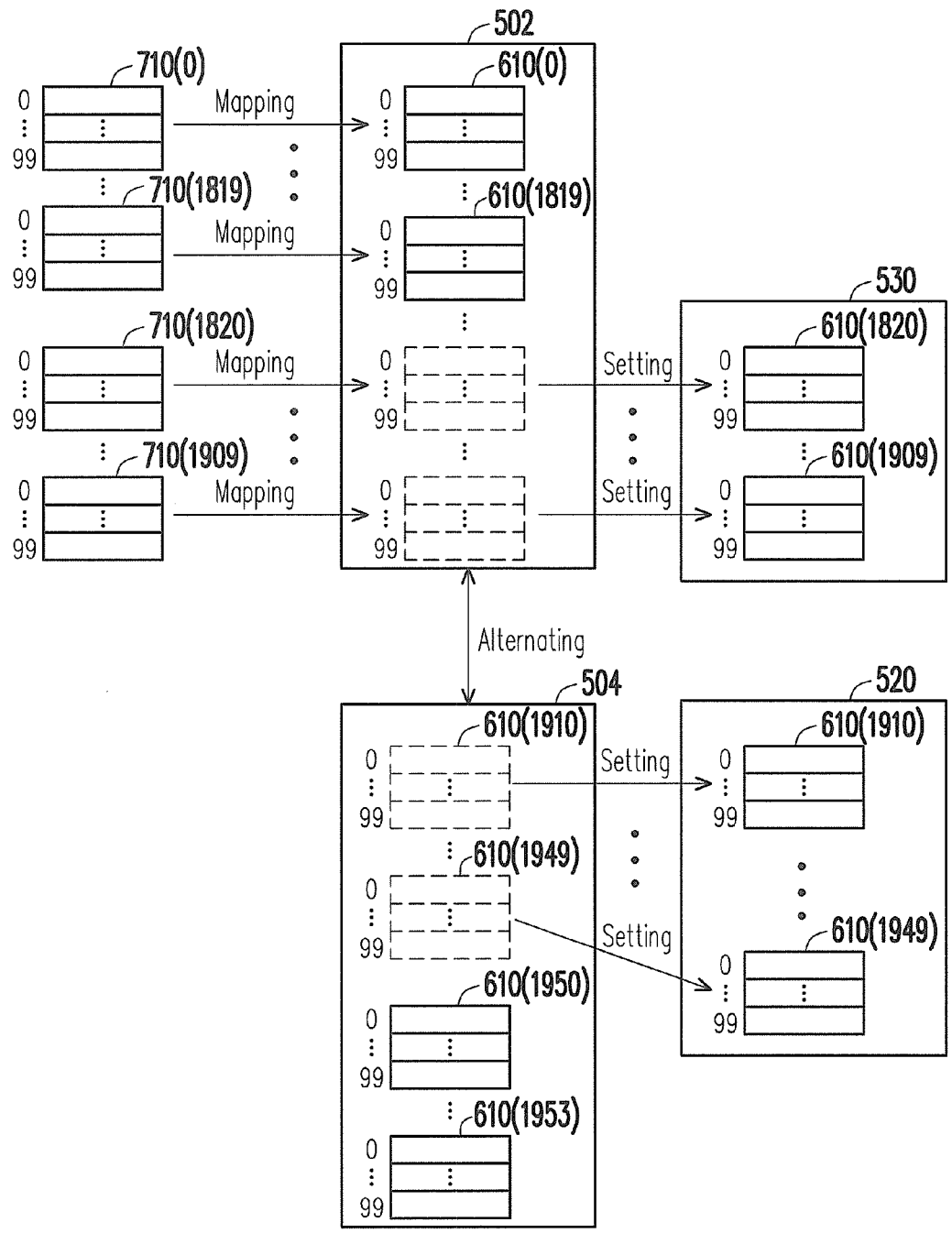
FIG. 5 is a schematic diagram illustrating an example of managing physical units of a data area and a free area according to an exemplary embodiment of the present invention.

FIG. 5 is a schematic diagram illustrating an example of managing physical units of the data area and the free area according to an exemplary embodiment of the present invention. For easily explaining, it is assumed that the number of the physical units of the data are 502 is 1910 (i.e. the physical units 610(0)-610(1909)), the number of the physical units of the free area 504 is 44 (i.e. the physical units 610(1910)-610(1953)), and the number of physical pages of each physical unit is 100.

Referring to FIG. 5, when the memory storage apparatus 100 is manufactured and is initialized, the memory management circuit 202 maps the logical units 710(0)-710(1909) to the physical units 610(0)-610(1909) of the data area 502. Now, even if the physical units 610(0)-610(1909) are still not written with data, the memory management circuit 202 still regards that the physical units 610(0)-610(1909) have been written with data. Moreover, the memory management circuit 202 may get 40 empty physical units (i.e. the physical units 610(1910)-610(1949) from the free area 504 to configure a first global random area 520, and gets 90 empty physical units (i.e. the physical units 610(1820)-610(1909) from the data area 502 to configure a second global random area 530.

Then, when the host system 1000 is about to store the updated data to the logical units, the memory management circuit 202 writes the updated data into the first global random area 520 or the second global random area 530. Particularly, after the updated data is written into the first global random area 520 and/or the second global random area 530, the memory management circuit 202 transmits a response indicating that the command is completed to the host system 1000, so as to reduce the time for executing the write command. Herein, when the updated data of a certain logical unit is temporarily stored to the first global random area 520 or the second global random area 530, such logical unit is referred to as an updated logical unit. Then, the memory management circuit 202 executes a data merging procedure at a suitable time to move data belonged to the same logical unit from the first global random area 520 or the second global random area 530 to an empty physical unit and update the mapping relationship of the updated logical unit and the physical unit in the logical unit-physical unit mapping table. It should be noticed that in the first global random area 520 or the second global random area 530, the memory management circuit 202 writes the updated data into each of the physical units according to a sequence of the physical pages, and only when one physical unit is fully written, the memory management circuit 202 uses another physical unit to write the updated data.

For example, when the host system 1000 is about to store updated data to a $0^{th}$ logical page of the logical unit 710(0), the memory management circuit 202 writes the updated data into a $0^{th}$ physical page of the physical unit 610(1910) of the first global random area 520. Then, when the host system 1000 is about to store updated data to a $99^{th}$ logical page of the logical unit 710(1), the memory management circuit 202 writes the updated data into a first physical page of the physical unit 610(1910) of the first global random area 520. Moreover, only when the physical unit 610(1910) is written full of the updated data, another physical unit in the first global random area 520 or the second global random area 530 is used to store the updated data.

Then, for example, when the global random area is about to be written full of the updated data, the memory management circuit 202 executes the data merging procedure to move valid data of the logical unit 710(0) to the physical unit 610(1950) of the free area 504, and erases the physical unit 610(0) originally mapped to the logical unit 710(0), and associates the physical unit 610(0) with the free area 504 and re-maps the logical unit 710(0) to the physical unit 610(1950) in the logical unit-physical unit mapping table.

It should be noticed that in the present exemplary embodiment, when the number of the physical units that are not written with the updated data among the physical units of the first global random area 520 is smaller than a first predetermined threshold, the memory management circuit 202 calculates a storage state assessing value corresponding to the first global random area 520, and determines whether or not to use the second global random area 530 to temporarily store the updated data from the host system 1000 according to the calculated storage state assessing value. Herein, the first predetermined threshold is set to 3, but the present invention is not limited thereto.

In detail, in the present exemplary embodiment, the memory management circuit 202 calculates an updated page number corresponding to each updated logical unit according to the updated data written to the first global random area 520, and calculates the storage state assessing value corresponding to the first global random area 520 according to the updated page numbers of the updated logical units, and determines whether or not to use the second global random area 530 to temporarily store the updated data from the host system 1000 according to the storage state assessing value.

Herein, the updated page number corresponding to a certain updated logical unit refers to the number of the updated logical pages in the updated logical unit. For example, as shown in FIG. 5, when the updated data belonging to the $0^{th}$-$3^{rd}$ logical pages of the logical unit 710(0) have been written to the physical pages of the first global random area 520, the memory management circuit 202 calculates the updated page number of the updated logical unit 710(0) to be 4. For example, when the updated data belonging to the $50^{th}$-$99^{th}$ logical pages of the logical unit 710(99) have been written to the physical pages of the first global random area 520, the memory management circuit 202 calculates the updated page number of the updated logical unit 710(99) to be 50.

In the present exemplary embodiment, the storage state assessing value is calculated according to a following equation (1):

$$SSEV = MaxUP \times NSGR \quad (1)$$

In the equation (1), SSEV represents the storage state assessing value corresponding to the first global random area 520, MaxUP represents a maximum updated page number among the updated page numbers of all of the updated logical units, and NSGR represents the number of the physical units of the second global random area 530.

It should be noticed that calculation of the storage state assessing value is not limited to the equation (1). In another exemplary embodiment, the storage state assessing value can also be calculated according to a following equation (2):

$$SSEV = AVGUP \times NSGR \quad (2)$$

In the equation (2), SSEV represents the storage state assessing value of the first global random area 520, AVGUP represents an average of the updated page numbers of all of the updated logical units, and NSGR represents the number of the physical units of the second global random area 530.

Moreover, in another exemplary embodiment of the present invention, the storage state assessing value can also be calculated according to a following equation (3):

$$SSEV = \sum_i UP_i \quad i \in SGR \quad (3)$$

In the equation (3), SSEV represents the storage state assessing value of the first global random area 520, $UP_i$ represents an updated page number of an $i^{th}$ physical unit, and SGR represents a set of the physical units of the second global random area 530.

In the exemplary embodiment of the present invention, when the calculated storage state assessing value is smaller than a predetermined assessing threshold, the memory management circuit 202 uses the second global random area 530 to write the updated data after the first global random area 520 is written full of the updated data. Herein, the predetermined assessing threshold is calculated according to a following equation (4):

$$DET = (SDNT - 1) \times NPP \quad (4)$$

In the equation (4), DET represents the predetermined assessing threshold, SDNT represents a second predetermined threshold, and NPP represents the number of the physical pages of one physical unit.

For example, as shown in FIG. 5, the second predetermined threshold is set to 7, and accordingly the predetermined assessing threshold is set to 600. However, it should be noticed that the second predetermined threshold is not limited to 7.

In the present exemplary embodiment, when the calculated storage state assessing value is not smaller than the predetermined assessing threshold, the memory management circuit 202 further determines whether the first global random area 520 stores the updated data belonging to the logical units mapped to the physical units of the second global random area 530.

When the first global random area 520 does not store the updated data belonging to the logical units mapped to the physical units of the second global random area 530, the memory management circuit 202 uses the second global random area 530 to write the updated data after the first global random area 520 is written full of the updated data.

When the first global random area 520 stores the updated data belonging to the logical units mapped to the physical units of the second global random area 530, the memory management circuit 202 cancels the second global random area 530, and executes the aforementioned data merging procedure. Namely, the second global random area 530 is not used to write the updated data. Herein, the so-called "cancel" the second global random area 530 refers to that the physical units (for example, the physical units 610(1820)-610(1909)) served as the second global random area 530 are restored to the data area 502.

It should be noticed that as the memory storage apparatus 100 continually operates, the memory management circuit 202 can re-get the empty physical units from the data area 502 to serve as the second global random area 530 at a suitable timing. For example, in another exemplary embodiment of the present invention, the memory management circuit 202 can recognize deleted logical units according to a trim command sent by the host system 1000, and recognize the physical units mapped to the deleted logical units as empty. Herein, the deleted logical units refers to the logical units that data stored thereon has been deleted by the host system 1000 through a file allocation table, and when an operating system of the host system 1000 is the Microsoft Windows 7, the host system 1000 can notify the memory storage apparatus 100 the logical units with data thereon being deleted through the trim command. In this way, after the host system 1000 deletes data, the memory management circuit 202 can recognize the empty physical units in the data area 502 and re-get the empty physical units from the data area 502 to serve as the second global random area 530.

Figure 6A:
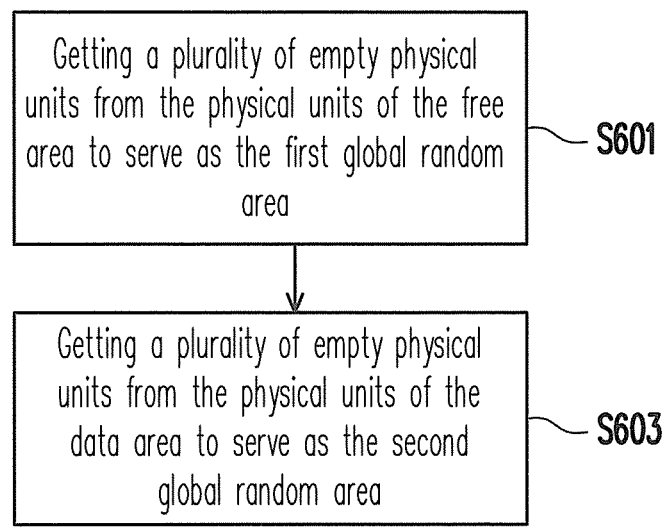
FIG. 6A is a flowchart illustrating a method of setting a first and a second global random areas according to a memory management method of an exemplary embodiment of the present invention.

FIG. 6A is a flowchart illustrating a method of setting the first and the second global random areas according to a memory management method of an exemplary embodiment of the present invention.

Referring to FIG. 6A, in the step S601, the memory management circuit 202 gets a plurality of empty physical units from the physical units of the free area 504 to serve as the first global random area 520. In step S603, the memory management circuit 202 gets a plurality of empty physical units from the physical units of the data area 502 to serve as the second global random area 530.

Figure 6B:
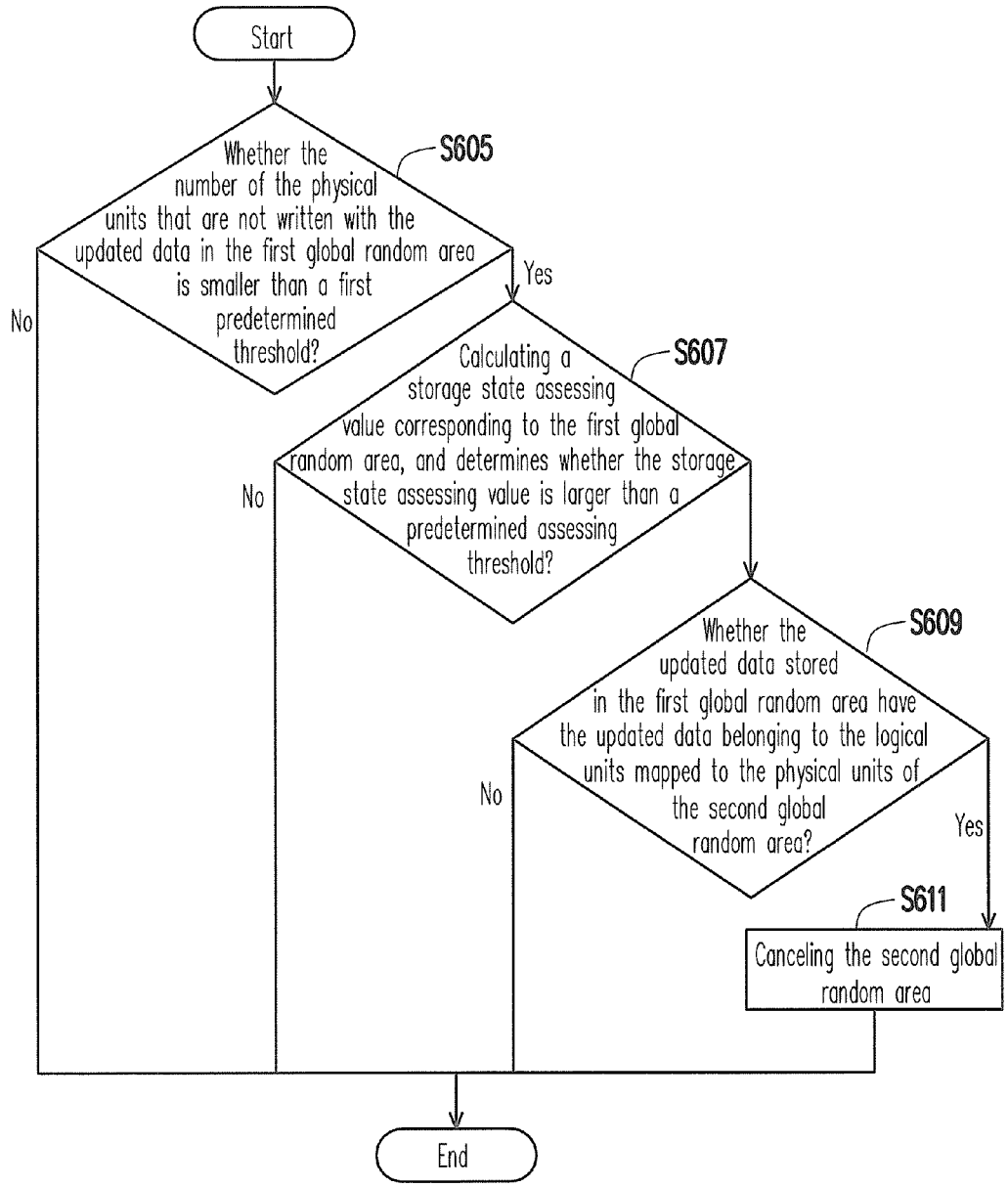
FIG. 6B is a flowchart illustrating a method of determining whether or not to cancel the second global random area according to the memory management method of an exemplary embodiment of the present invention.

FIG. 6B is a flowchart illustrating a method of determining whether or not to cancel the second global random area according to the memory management method of an exemplary embodiment of the present invention, in which steps for determining whether the second global random area 530 is used to store the updated data when the second global random area 530 is configured and the first global random area 520 is about to be written full of the updated data are described.

Referring to FIG. 6B, in step S605, the memory management circuit 202 determines whether the number of the physical units that are not written with the updated data in the first global random area 520 is smaller than the first predetermined threshold.

When the number of the physical units that are not written with the updated data in the first global random area 520 is not smaller than the first predetermined threshold, the flow of FIG. 6B is ended (i.e. the second global random area 530 is not cancelled).

When the number of the physical units that are not written with the updated data in the first global random area 520 is smaller than the first predetermined threshold, in step S607, the memory management circuit 202 calculates the storage state assessing value corresponding to the first global random area 520, and determines whether the storage state assessing value is larger than the predetermined assessing threshold. Herein, the methods of calculating the storage state assessing value corresponding to the first global random area 520 have been described above, so that detailed descriptions thereof are not repeated.

When the storage state assessing value is not larger than the predetermined assessing threshold, the flow of FIG. 6B is ended (i.e. the second global random area 530 is not cancelled).

When the storage state assessing value is larger than the predetermined assessing threshold, in step S609, the memory management circuit 202 determines whether the updated data stored in the first global random area 520 has the updated data belonging to the logical units mapped to the physical units of the second global random area 530.

When the updated data stored in the first global random area 520 does not have the updated data belonging to the logical units mapped to the physical units of the second global random area 530, the flow of FIG. 6B is ended (i.e. the second global random area 530 is not cancelled).

When the updated data stored in the first global random area 520 has the updated data belonging to the logical units mapped to the physical units of the second global random area 530, in step S611, the memory management circuit 202 cancels the second global random area 530.

Figure 6C:
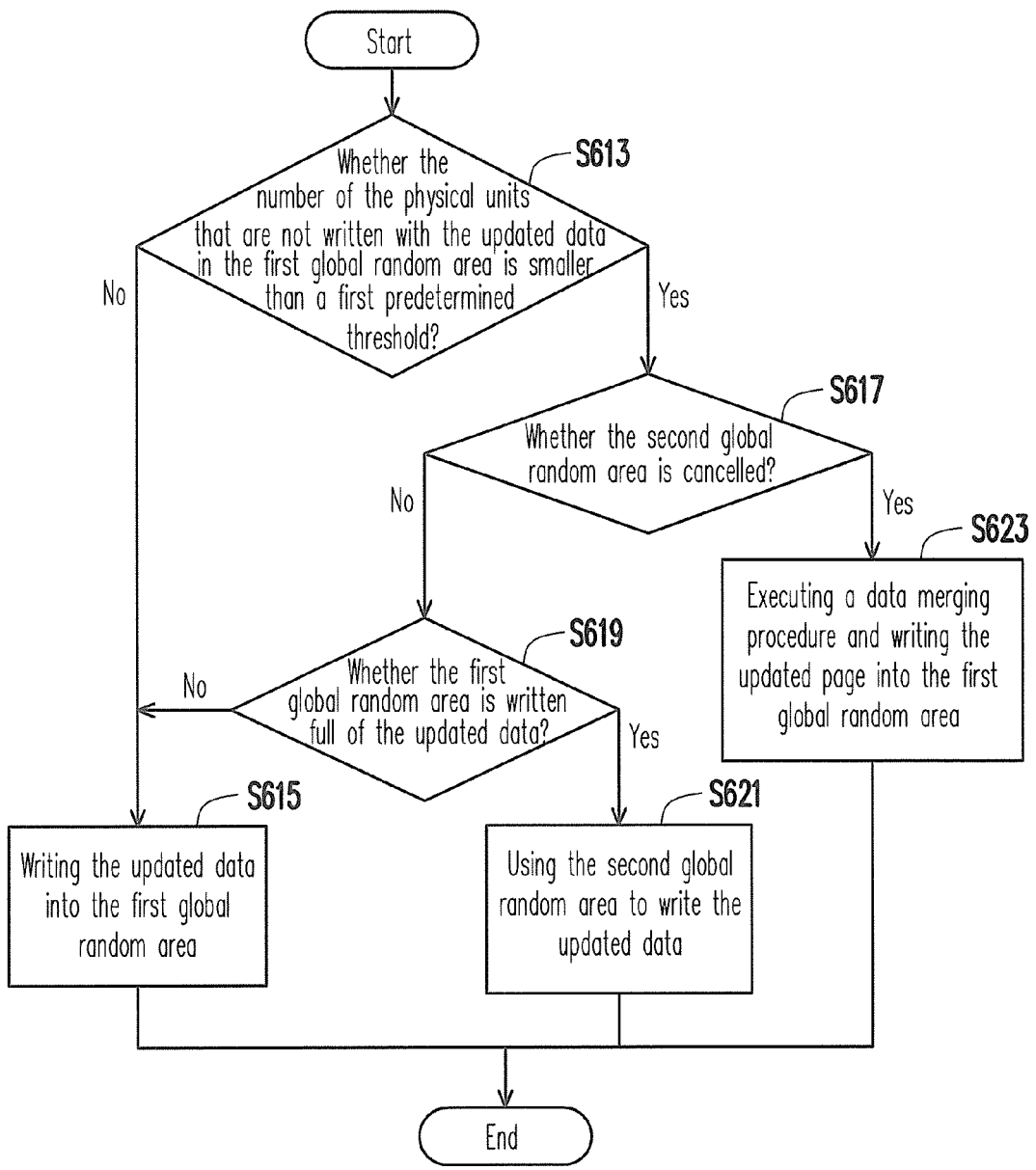
FIG. 6C is a flowchart illustrating a method of writing updated data according to the memory management method of an exemplary embodiment of the present invention.

FIG. 6C is a flowchart illustrating a method of writing updated data according to the memory management method of an exemplary embodiment of the present invention.

Referring to FIG. 6C, when the updated data is to be written, in step S613, the memory management circuit 202 determines whether the number of the physical units that are not written with the updated data in the first global random area 520 is smaller than the first predetermined threshold.

When the number of the physical units that are not written with the updated data in the first global random area 520 is not smaller than the first predetermined threshold, in step S615, the memory management circuit 202 writes the updated data into the first global random area 520.

When the number of the physical units that are not written with the updated data in the first global random area 520 is smaller than the first predetermined threshold, in step S617, the memory management circuit 202 determines whether the second global random area 530 is cancelled.

When the second global random area 530 is not cancelled, in step S619, the memory management circuit 202 determines whether the first global random area 520 is written full of the updated data.

When the first global random area 520 is not written full of the updated data, the step S615 is executed.

When the first global random area 520 is written full of the updated data, in step S621, the memory management circuit 202 uses the second global random area 530 to write the updated data.

In the step S617, when it is determined that the second global random area 530 is cancelled, in step S623, the memory management circuit 202 executes the data merging procedure and writes the updated data into the first global random area 520.

Figure 7:
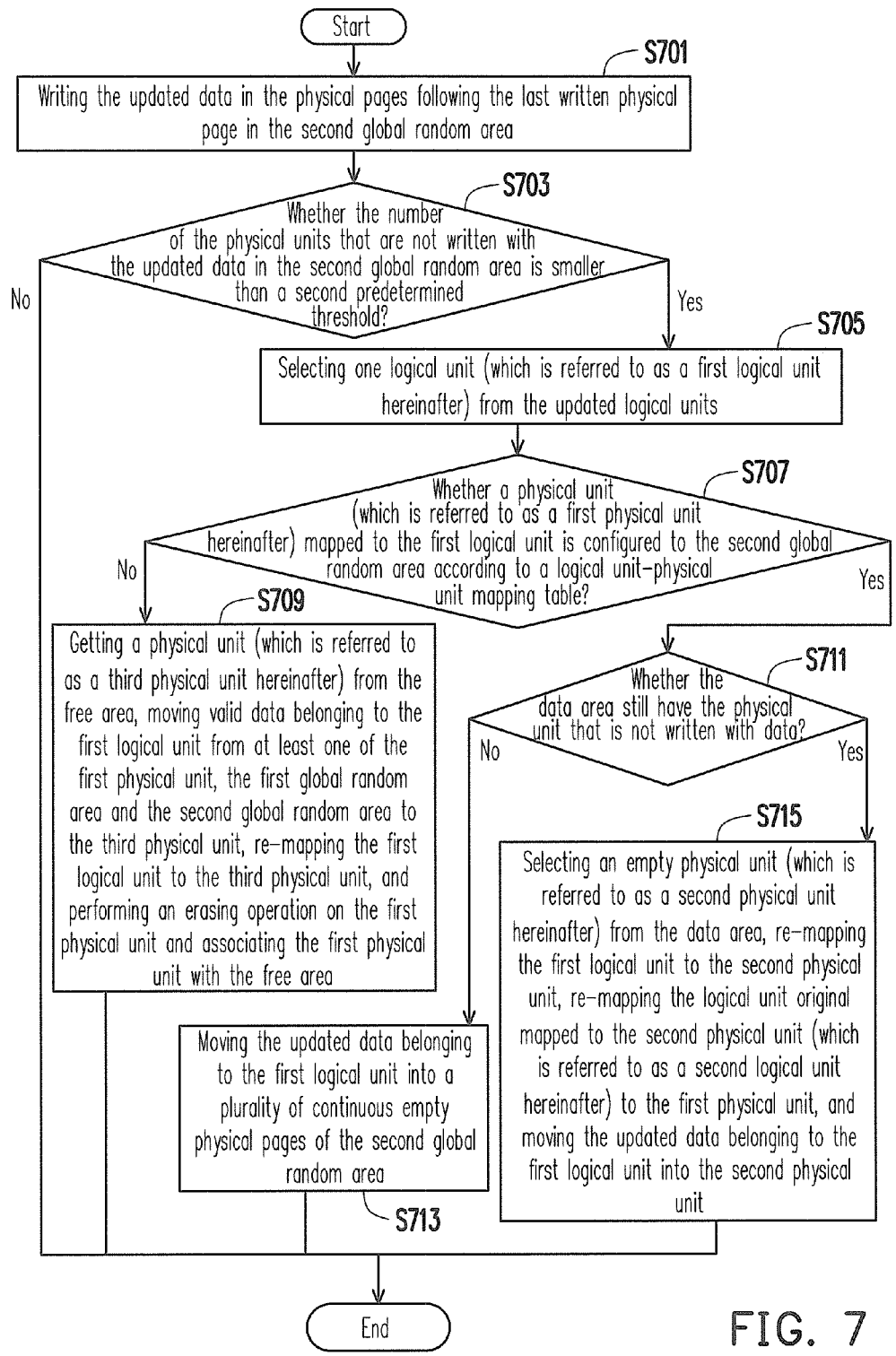
FIG. 7 is a flowchart illustrating detailed steps of a step S621 of FIG. 6C according to an exemplary embodiment of the present invention.

FIG. 7 is a flowchart illustrating detailed steps of the step S621 of FIG. 6C according to an exemplary embodiment of the present invention.

Referring to FIG. 7, in step S701, the memory management circuit 202 writes the updated data in the physical pages following the last written physical page in the second global random area 530. Moreover, in step S703, the memory management circuit 202 determines whether the number of the physical units that are not written with the updated data in the second global random area 530 is smaller than the second predetermined threshold.

When the number of the physical units that are not written with the updated data in the second global random area 530 is not smaller than the second predetermined threshold, the flow of FIG. 7 is ended.

When the number of the physical units that are not written with the updated data in the second global random area 530 is smaller than the second predetermined threshold, in step S705, the memory management circuit 202 selects one logical unit (which is referred to as a first logical unit hereinafter) from the updated logical units, and in step S707, the memory management circuit 202 determines whether a physical unit (which is referred to as a first physical unit hereinafter) mapped to the first logical unit is configured to the second global random area 530 according to the logical unit-physical unit mapping table.

When the first physical unit is not configured to the second global random area 530, in step S709, the memory management circuit 202 gets a physical unit (which is referred to as a third physical unit hereinafter) from the free area 504, moves valid data belonging to the first logical unit from at least one of the first physical unit, the first global random area 520 and the second global random area 530 to the third physical unit, re-maps the first logical unit to the third physical unit, performs an erasing operation on the first physical unit and associates the first physical unit with the free area 504.

When the first physical unit is configured to the second global random area 530, in step S711, the memory management circuit 202 determines whether the data area 502 still has the physical unit that is not written with data (i.e. the empty physical unit).

If the data area 502 does not have the empty physical unit, in step S713, the memory management circuit 202 moves the updated data belonging to the first logical unit into a plurality of continuous empty physical pages of the second global random area 530, wherein these continuous physical pages follow the last physical page currently written with the updated data in the second global random area 530. In detail, the updated data belonging to the first logical unit has been probably written to the first global random area 520 and/or the second global random area 530, separately, and the memory management circuit 202 may integrate and write these updated data into the physical pages following the last physical page currently written with the updated data in the second global random area 530.

If the data area 502 has the empty physical unit, in step S715, the memory management circuit 202 selects an empty physical unit (which is referred to as a second physical unit hereinafter) from the data area 502, re-maps the first logical unit to the second physical unit, re-maps the logical unit originally mapped to the second physical unit (which is referred to as a second logical unit hereinafter) to the first physical unit, and moves the updated data belonging to the first logical unit to the second physical unit. In detail, the updated data belonging to the first logical unit has been probably written to the first global random area 520 and/or the second global random area 530, separately, and the memory management circuit 202 may integrate and move the updated data to the second physical unit.

It should be noticed that in the present exemplary embodiment, the step of determining whether the number of the physical units that are not written with the updated data in the second global random area 530 is smaller than the second predetermined threshold (i.e. the step S703) is executed after the step of writing the updated data (i.e. the step S701), and when it is determined that the number of the physical units that are not written with the updated data in the second global random area 530 is smaller than the second predetermined threshold, the corresponding step is executed to avoid exhausting the physical units of the second global random area 530. However, it should be noticed that the present invention is not limited thereto, and in another exemplary embodiment, the step of writing the updated data (i.e. the step S701) can also be executed after the steps S703, S705, S707, S709, S711, S713 and S715.

In summary, in the memory management method, the memory controller and the memory storage apparatus using the same of the present invention, the physical units that are not written with data in the data area can be temporarily used as the physical units of the second global random area. In this way, when the physical units of the first global random area is about to be written full of the updated data, the physical units of the second global random area can be used to complete the write command without executing the data merging procedure, so as to shorten the time for executing the write command. The previously described exemplary embodiments of the present invention have the advantages aforementioned, wherein the advantages aforementioned not required in all versions of the present invention.

It will be apparent to those skilled in the art that various modifications and variations can be made to the structure of the present invention without departing from the scope or spirit of the present invention. In view of the foregoing, it is intended that the present invention cover modifications and variations of this invention provided they fall within the scope of the following claims and their equivalents.

What is claimed is:

1. A memory management method for managing a plurality of physical units of a rewritable non-volatile memory module, wherein each of the physical units has a plurality of physical pages arranged in a sequence, and the physical units are grouped into at least a data area and a free area, and the physical units of the free area are used to substitute the physical units of the data area for writing data, the memory management method comprising:
    configuring a plurality of logical units to map to the physical units of the data area, wherein each of the logical units has a plurality of logical pages;
    getting a plurality of empty physical units from the physical units of the free area to serve as a first global random area;
    getting a plurality of empty physical units from the physical units of the data area to serve as a second global random area;
    using the physical units of the first global random area to write updated data, wherein the updated data belongs to a plurality of updated logical units among the logical units;
    determining whether a number of the physical units that are not written with the updated data among the physical units of the first global random area is smaller than a first predetermined threshold;
    when the number of the physical units that are not written with the updated data among the physical units of the first global random area is smaller than the first predetermined threshold, calculating a storage state assessing value corresponding to the first global random area and determining whether the storage state assessing value is larger than a predetermined assessing threshold; and
    using the physical units of the second global random area to write other updated data after the physical units of the first global random area are written full of the updated data when the storage state assessing value is not larger than the predetermined assessing threshold.

2. The memory management method as claimed in claim 1, further comprising:
    determining whether the updated data has at least one updated data belonging to the logical units mapped to the physical units of the second global random area; and
    cancelling the second global random area when the storage state assessing value is larger than the predetermined assessing threshold and the updated data has the at least one updated data belonging to the logical units mapped to the physical units of the second global random area.

3. The memory management method as claimed in claim 2, further comprising:
    using the physical units of the second global random area to write the other updated data after the physical units of the first global random area are written full of the updated data when the storage state assessing value is larger than the predetermined assessing threshold and the updated data does not have any updated data belonging to the logical units mapped to the physical units of the second global random area.

4. The memory management method as claimed in claim 1, wherein the step of calculating the storage state assessing value corresponding to the first global random area comprises:
    calculating updated page numbers respectively corresponding to the updated logical units according to the updated data, wherein each of the updated page numbers is the number of the updated logical pages in each of the updated logical unit;
    recognizing a maximum updated page number among the updated page numbers; and
    multiplying the maximum updated page number by the number of the physical units of the second global random area to obtain the storage state assessing value.

5. The memory management method as claimed in claim 1, wherein the step of calculating the storage state assessing value of the first global random area comprises:

calculating updated page numbers respectively corresponding to the updated logical units according to the updated data, wherein each of the updated page numbers is the number of the updated logical pages in each of the updated logical unit;

calculating an average updated page number of the updated page numbers; and multiplying the average updated page number by the number of the physical units of the second global random area to obtain the storage state assessing value.

6. The memory management method as claimed in claim 1, wherein the step of calculating the storage state assessing value of the first global random area comprises:

recognizing updated data belonging to the logical units mapped to the physical units of the second global random area among the updated data; and taking the number of the updated data belonging to the logical units mapped to the physical units of the second global random area among the updated data as the storage state assessing value.

7. The memory management method as claimed in claim 1, further comprising:

determining whether the number of the physical units that are not written with the updated data among the physical units of the second global random area is smaller than a second predetermined threshold; and selecting a first logical unit from the logical units and executing a data merging procedure corresponding to the first logical unit when the number of the physical units that are not written with the updated data among the physical units of the second global random area is smaller than the second predetermined threshold, wherein the first logical unit maps to a first physical unit among the physical units and the data merging procedure comprises:

determining whether the first physical unit belongs to the second global random area; and when the first physical unit does not belong to the second global random area, getting a third physical unit from the free area, moving valid data belonging to the first logical unit from the first physical unit and the physical units of the first global random area and the second global random area into the third physical unit, re-mapping the first logical unit to the third physical unit, and associating the first physical unit with the free area.

8. The memory management method as claimed in claim 7, further comprising:

determining whether the data area has a second physical unit when the first physical unit belongs to the second global random area, wherein the second physical unit is empty and maps to a second logical unit among the logical units;

when the data area has the second physical unit, re-mapping the first logical unit to the second physical unit, re-mapping the second logical unit to the first physical unit and moving at least one updated data belonging to the first logical unit from the physical units of the first global random area and the second global random area into the second physical unit.

9. The memory management method as claimed in claim 8, further comprising:

moving the at least one updated data belonging to the first logical unit from the physical units of the first global random area and the second global random area into a plurality of continuous physical pages in the second global random area when the data area does not have the second physical unit.

10. The memory management method as claimed in claim 7, wherein the predetermined assessing threshold is calculated according to an equation (4):

$$DET=(SDNT-1)\times NPP \quad (4)$$

wherein DET represents the predetermined assessing threshold, SDNT represents the second predetermined threshold, and NPP represents the number of the physical pages of any one of the physical units.

11. The memory management method as claimed in claim 1, further comprising:

recognizing a plurality of deleted logical units among the logical units according to a trim command; and recognizing the physical units mapped to the deleted logical units as empty.

12. A memory controller for controlling a rewritable non-volatile memory module, wherein the rewritable non-volatile memory module has a plurality of physical units, and each of the physical units has a plurality of physical pages arranged in a sequence, the memory controller comprising:

a memory interface, coupled to the rewritable non-volatile memory module; and a memory management circuit, coupled to the memory interface, wherein the memory management circuit is configured for grouping the physical units into at least a data area and a free area, wherein the physical units of the free area are used to substitute the physical units of the data area for writing data, wherein the memory management circuit configures a plurality of logical units to map to the physical units of the data area, wherein each of the logical units has a plurality of logical pages, wherein the memory management circuit gets a plurality of empty physical units from the physical units of the free area to serve as a first global random area, gets a plurality of empty physical units from the physical units of the data area to serve as a second global random area, and uses the physical units of the first global random area to write updated data, wherein the updated data belongs to a plurality of updated logical units among the logical units, wherein the memory management circuit determines whether a number of the physical units that are not written with the updated data among the physical units of the first global random area is smaller than a first predetermined threshold, wherein when the number of the physical units that are not written with the updated data among the physical units of the first global random area is smaller than the first predetermined threshold, the memory management circuit calculates a storage state assessing value corresponding to the first global random area, and determines whether the storage state assessing value is larger than a predetermined assessing threshold, wherein when the storage state assessing value is not larger than the predetermined assessing threshold, the memory management circuit uses the physical units of the second global random area to write other updated data after the physical units of the first global random area are written full of the updated data.

13. The memory controller as claimed in claim 12, wherein the memory management circuit determines whether the updated data has at least one updated data belonging to the logical units mapped to the physical units of the second global random area, wherein when the storage state assessing value is larger than the predetermined assessing threshold and the updated data has the at least one updated data belonging to the logical units mapped to the physical units of the second global random area, the memory management circuit cancels the second global random area.

14. The memory controller as claimed in claim 13, wherein when the storage state assessing value is larger than the predetermined assessing threshold and the updated data does not have any updated data belonging to the logical units mapped to the physical units of the second global random area, the memory management circuit uses the physical units of the second global random area to write other updated data after the physical units of the first global random area are written full of the updated data.

15. The memory controller as claimed in claim 12, wherein the memory management circuit calculates updated page numbers respectively corresponding to the updated logical units according to the updated data, recognizes a maximum updated page number among the updated page numbers, and multiplies the maximum updated page number by the number of the physical units of the second global random area to obtain the storage state assessing value, wherein each of the updated page numbers is the number of the updated logical pages in each of the updated logical unit.

16. The memory controller as claimed in claim 12, wherein the memory management circuit calculates updated page numbers respectively corresponding to the updated logical units according to the updated data, calculates an average updated page number of the updated page numbers, and multiplies the average updated page number by the number of the physical units of the second global random area to obtain the storage state assessing value, wherein each of the updated page numbers is the number of the updated logical pages in each of the updated logical unit.

17. The memory controller as claimed in claim 12, wherein the memory management circuit recognizes updated data belonging to the logical units mapped to the physical units of the second global random area among the updated data, and takes the number of the updated data belonging to the logical units mapped to the physical units of the second global random area among the updated data as the storage state assessing value.

18. The memory controller as claimed in claim 12, wherein the memory management circuit determines whether the number of the physical units that are not written with the updated data among the physical units of the second global random area is smaller than a second predetermined threshold, wherein when the number of the physical units that are not written with the updated data among the physical units of the second global random area is smaller than the second predetermined threshold, the memory management circuit selects a first logical unit from the logical units and determines whether a first physical unit mapped to the first logical units among the physical units belongs to the second global random area, wherein when the first physical unit does not belong to the second global random area, the memory management circuit gets a third physical unit from the free area, moves valid data belonging to the first logical unit from the first physical unit and the physical units of the first global random area and the second global random area into the third physical unit, re-maps the first logical unit to the third physical unit, and associates the first physical unit with the free area.

19. The memory controller as claimed in claim 18, wherein when the first physical unit belongs to the second global random area, the memory management circuit determines whether the data area has a second physical unit, wherein the second physical unit is empty and maps to a second logical unit among the logical units, wherein when the data area has the second physical unit, the memory management circuit re-maps the first logical unit to the second physical unit, re-maps the second logical unit to the first physical unit, and moves at least one updated data belonging to the first logical unit from the physical units of the first global random area and the second global random area into the second physical unit.

20. The memory controller as claimed in claim 19, wherein when the data area does not have the second physical unit, the memory management circuit moves the at least one updated data belonging to the first logical unit from the physical units of the first global random area and the second global random area into a plurality of continuous physical pages in the second global random area.

21. The memory controller as claimed in claim 18, wherein the predetermined assessing threshold is calculated according to an equation (4):

$$DET=(SDNT-1) \times NPP \qquad (4)$$

wherein DET represents the predetermined assessing threshold, SDNT represents the second predetermined threshold, and NPP represents the number of the physical pages of any one of the physical units.

22. A memory storage apparatus, comprising:

a rewritable non-volatile memory module, having a plurality of physical units, wherein each of the physical units has a plurality of physical pages arranged in a sequence; and a memory controller, coupled to the rewritable non-volatile memory module, wherein the memory controller groups the physical units into at least a data area and a free area, wherein the physical units of the free area are used to substitute the physical units of the data area for writing data, wherein the memory controller configures a plurality of logical units to map to the physical units of the data area, wherein each of the logical units has a plurality of logical pages, wherein the memory controller gets a plurality of empty physical units from the physical units of the free area to serve as a first global random area, gets a plurality of empty physical units from the physical units of the data area to serve as a second global random area, and uses the physical units of the first global random area to write updated data, wherein the updated data belongs to a plurality of updated logical units among the logical units, wherein the memory controller determines whether a number of the physical units that are not written with the updated data among the physical units of the first global random area is smaller than a first predetermined threshold, wherein when the number of the physical units that are not written with the updated data among the physical units of the first global random area is smaller than the first predetermined threshold, the memory controller calculates a storage state assessing value corresponding to the first global random area, and determines whether the storage state assessing value is larger than a predetermined assessing threshold, wherein when the storage state assessing value is not larger than the predetermined assessing threshold, the memory controller uses the physical units of the second global random area to write other updated data after the physical units of the first global random area are written full of the updated data.

23. The memory storage apparatus as claimed in claim 22, wherein the memory controller determines whether the updated data has at least one updated data belonging to the logical units mapped to the physical units of the second global random area, wherein when the storage state assessing value is larger than the predetermined assessing threshold and the updated data has the at least one updated data belonging to the logical units mapped to the physical units of the second global random area, the memory controller cancels the second global random area.

24. The memory storage apparatus as claimed in claim 23, wherein when the storage state assessing value is larger than the predetermined assessing threshold and the updated data does not have any updated data belonging to the logical units mapped to the physical units of the second global random area, the memory controller uses the physical units of the second global random area to write other updated data after the physical units of the first global random area are written full of the updated data.

25. The memory storage apparatus as claimed in claim 22, wherein the memory controller calculates updated page numbers respectively corresponding to the updated logical units according to the updated data, recognizes a maximum updated page number among the updated page numbers, and multiplies the maximum updated page number by the number of the physical units of the second global random area to obtain the storage state assessing value, wherein each of the updated page numbers is the number of the updated logical pages in each of the updated logical unit.

26. The memory storage apparatus as claimed in claim 22, wherein the memory controller calculates updated page numbers respectively corresponding to the updated logical units according to the updated data, calculates an average updated page number of the updated page numbers, and multiplies the average updated page number by the number of the physical units of the second global random area to obtain the storage state assessing value, wherein each of the updated page numbers is the number of the updated logical pages in each of the updated logical unit.

27. The memory storage apparatus as claimed in claim 22, wherein the memory controller recognizes updated data belonging to the logical units mapped to the physical units of the second global random area among the updated data, and takes the number of the updated data belonging to the logical units mapped to the physical units of the second global random area among the updated data as the storage state assessing value.

28. The memory storage apparatus as claimed in claim 22, wherein the memory controller determines whether the number of the physical units that are not written with the updated data among the physical units of the second global random area is smaller than a second predetermined threshold, wherein when the number of the physical units that are not written with the updated data among the physical units of the second global random area is smaller than the second predetermined threshold, the memory controller selects a first logical unit from the logical units and determines whether a first physical unit mapped to the first logical units among the physical units belongs to the second global random area, wherein when the first physical unit does not belong to the second global random area, the memory controller gets a third physical unit from the free area, moves at least one updated data belonging to the first logical unit from the first physical unit and the physical units of the first global random area and the second global random area into the third physical unit, re-maps the first logical unit to the third physical unit, and associates the first physical unit with the free area.

29. The memory storage apparatus as claimed in claim 28, wherein when the first physical unit belongs to the second global random area, the memory controller determines whether the data area has a second physical unit, wherein the second physical unit is empty and maps to a second logical unit among the logical units, wherein when the data area has the second physical unit, the memory controller re-maps the first logical unit to the second physical unit, re-maps the second logical unit to the first physical unit, and moves the at least one updated data belonging to the first logical unit from the physical units of the first global random area and the second global random area to the second physical unit.

30. The memory storage apparatus as claimed in claim 29, wherein when the data area does not have the second physical unit, the memory controller moves the at least one updated data belonging to the first logical unit from the physical units of the first global random area and the second global random area into a plurality of continuous physical pages in the second global random area.

31. The memory storage apparatus as claimed in claim 28, wherein the predetermined assessing threshold is calculated according to an equation (4):

$$DET = (SDNT - 1) \times NPP \qquad (4)$$

wherein DET represents the predetermined assessing threshold, SDNT represents the second predetermined threshold, and NPP represents the number of the physical pages of any one of the physical units.

* * * * *